Jan. 27, 1953

H. M. VEAUX

AUTOMATIC SWITCHING SYSTEM FOR ELECTRICAL TELECOMMUNICATIONS 2,626,987

Filed July 3, 1947

2 SHEETS—SHEET 1

INVENTOR.

HENRI MAURICE VEAUX

BY Robert Harding Jr.

ATTORNEY

INVENTOR.
HENRI MAURICE VEAUX
BY
Robert Harding Jr.
ATTORNEY

Patented Jan. 27, 1953 2,626,987

UNITED STATES PATENT OFFICE 2,626,987

AUTOMATIC SWITCHING SYSTEM FOR ELECTRICAL TELECOMMUNICATIONS

Henri Maurice Veaux, St. Leu La Foret, France, assignor to International Standard Electric Corporation, New York, N. Y., a corporation of Delaware Application July 3, 1947, Serial No. 758,849
In France September 13, 1944

Section 1, Public Law 690, August 8, 1946
Patent expires September 13, 1964

1 Claim. (Cl. 178—5.6)

This invention relates to systems for the automatic transmission and reception of facsimiles of pictures, telegraph messages and other images between a number of stations over conductors or by radio waves.

Patent application Serial No. 758,851 (now abandoned) discloses the principles controlling an arrangement of a telecommunication network, including a multiplex system based on time distribution of messages. Such a system is particularly suitable for the use of automatic switching by electron tubes. The actual embodiments based on these principles will, however, differ, particularly depending upon whether picture transmission, a telegraph system, or a telephone system is employed.

The modern trend of systems of this type is toward the use of two kinds of network; (1) a picture transmission network with high speed transmission and automatic switching to selected receivers, adapted for the use of subscribers in large cities; and (2) a telegraph system comprising apparatus with a relatively limited output (teleprinters, for instance) which may extend even to the least important localities and includes automatic switching suitable for producing a quick exchange of communications.

The general object of this invention is to provide a system in which facsimiles may be transmitted automatically over the same line from any one of a plurality of transmitting stations to a selected receiver or receivers. A more specific purpose is to provide improved arrangements for controlling the time relationship between transmitted messages and the selective reception of such messages by various receiving stations.

Other objects and advantages will appear from the following description, considered in connection with the accompanying drawings, in which.

Figure 1:
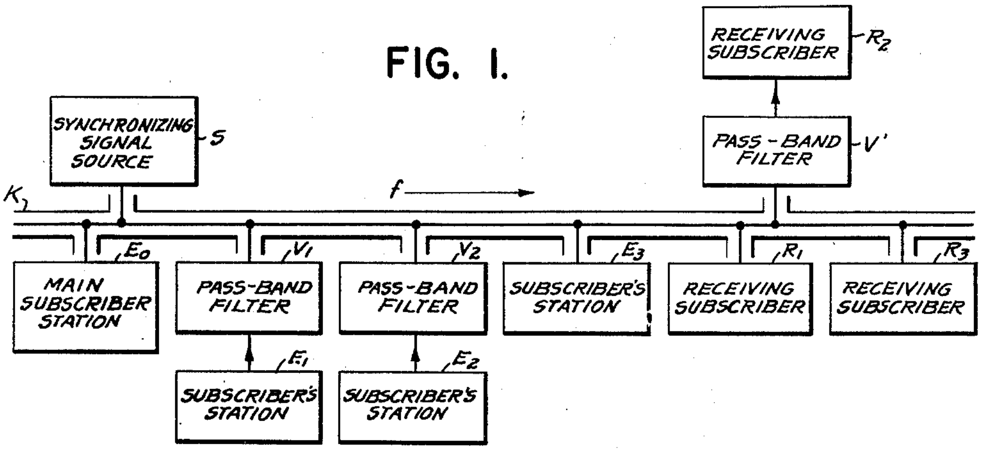
Fig. 1 is a diagram showing a plurality of transmitting and receiving stations connected to a coaxial line.

The picture transmission network illustrated in Fig. 1 is of the type in which a coaxial cable K is employed for traffic in one direction between a plurality of transmitting subscribers and a plurality of receiving subscribers. The transmitting subscribers are of two kinds; those connected directly to the coaxial cable ($E_0$, $E_3$) and others ($E_1$, $E_2$) each connected to said cable through an intermediate unit ($V_1$, $V_2$) having a relatively restricted pass band. The receiving subscribers are similarly classified, $R_1$, $R_3$ being directly connected to the cable while $R_2$ is connected to the cable through a restricted pass band unit V′.

The arrangement according to the present invention provides for distribution of the traffic from a main station $E_0$ at the head of the line to selected subscribers, such as $R_1$ and $R_3$ connected directly to the cable, and subscribers such as $R_2$ connected thereto by a high speed switching arrangement V′, which may include a time conversion arrangement as hereafter explained. The invention also provides for the distribution of traffic from an auxiliary transmitting subscriber such as $E_1$ to one or more of said receiving subscribers.

The automatic switching arrangement by which a subscriber is selected for reception of a message is based on the transmission during the first line of each image of special signals which form the switching code of the intended receiving subscriber or subscribers. The reception of this signal selectively opens the receiver of each such subscriber to the message.

There are two ways of allotting various periods to the transmitting subscribers. These periods may either be available for seizure by the first transmitter which is prepared to transmit a message, or specific periods may be allocated to particular transmitters. For instance, if a cycle of transmission, corresponding to one complete rotation of the belt above described, includes the transmission of N images, corresponding in number to the number of positions on said belt, then a number of $N_0$ of images from each cycle, the order of which within the cycle is either selected at will or in accordance with service conditions, may be allocated specifically to transmitter $E_0$.

Each message may either be directed to a receiver designated by the code at the beginning of the message or may be automatically switched to a particular receiver in accordance with the order of the particular message period in the cycle; that is, the message in the first period of each cycle may automatically go to receiver $R_1$. The remaining channels which are not specifically assigned to transmitter $E_0$ may either be allocated, according to their order in the cycle, to the other transmitting subscribers $E_1$, $E_2$, $E_3$, or placed at the disposal of the first of these that is ready to transmit.

The embodiment of a system of this type employs a suitable combination of elements which are known in picture transmission and in television. To give an example by way of illustration and not of limitation, it will be assumed that the speed of transmission is adjusted to one image per second and that the quality of each image is in accordance with the specifications adopted in international photography (size 13 x 18 cms. pass band approximately 300 kc./s.). The quality remaining the same, an increase or a decrease in the speed of transmission effects principally the width of the frequency band occupied in the coaxial cable.

The necessity for transmitting different frequencies may be met, in accordance with the solution normally adopted for the transmission of television signals over a cable, by a change in the frequency spectrum obtained by modulation of a carrier frequency. Adequately spaced repeaters may be used along the cable for transmission in one direction, and are useful to avoid signal reflections and to suppress accidental echoes.

When each image period is specifically allotted to a receiving subscriber the synchronizing signal transmitter S transmits at the beginning of each period a signal which releases the corresponding receiver for reception. When the periods are not thus allotted, the message form carries at its top an inscription which provides the signal forming the code of the designated receiver subscriber. Several arrangements may be employed for this purpose. The public may be supplied with forms each of which is to be used for transmitting messages for a particular subscriber, the forms differing only in the code signal at the top of each. This code signal may be inscribed by the user or by a telegraph operator who may use an appropriate machine. This code signal is translated into an electrical signal during the usual scanning of the message form.

The signals which form the codes designating the various message periods and the various receiving subscribers may be varied in duration and in their frequency spectrum. Each code may consist of a sequence of oscillation trains of the same duration but of different frequencies in a predetermined order. The number of frequencies used for the series of code signals will then depend upon the number of subscribers or on the number of periods.

Since the code signal is limited to the first scanned line of each image, and as each signal train constituting a code signal must comprise an appreciable number of elements (50 to 100, for instance), the frequencies of the code signals must be substantially higher than the line frequency used in transmitting the images. One arrangement hereafter described in detail employs a mosaic tube of the television type on which the image is initially impressed; and with this arrangement a mosaic grid which has 500 points per line is set for sending a code signal which may consist of 5 trains of elements as hereinafter described, the mosaic tube being scanned at the rate of one 500 line image per second.

With this arrangement the code signal transmission can not interfere with the image signals, since they are not simultaneously transmitted. On the other hand, while conceivably the image signals might produce a frequency combination which would have the same effect as a code signal, this is unlikely. It can be avoided entirely by employing for the signals a narrow frequency band which may be in the open part of the image signal wave spectrum and can be sharply restricted, since standard tuned receiving circuits can operate on waves differing only slightly in frequency.

Where the code signal is based on an inscription on the message form, said inscription may be provided in the form of a train of parallel black bars on a white background, scanned transversely by the reading beam. By properly spacing the bars and adjusting the scanning speed of the reading beam the exact desired signal frequencies can be obtained.

Figure 2:
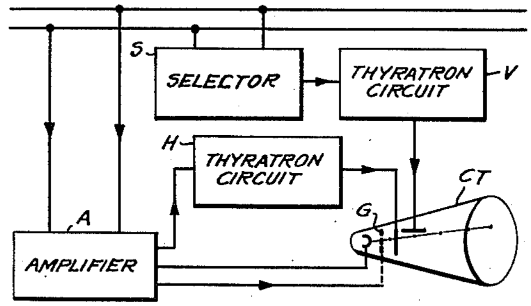
Fig. 2 is a diagram of one form of receiving station.

Fig. 2 is a diagram of a receiver of television type used by a subscriber, such as $R_1$, connected directly to the coaxial cable. In this embodiment signals from the cable are fed to the amplifier A which applies the image transmission to the control grid G of the cathode ray tube CT, and also provides the triggering impulse of the thyratron circuit H which controls horizontal scanning. Vertical scanning is controlled by the thyratron circuit V triggered by the image signal pulse relayed by the selector circuit S when the code signal of the receiving station is received by S. The line synchronizing pulses are timed in the usual manner. The image triggering pulses generated in response to the code signal as hereafter described are selectively received by frequency selection.

The receiving system is normally in inoperative condition, and is released by the appropriate code signal only during the succeeding image period. This may be accomplished in various ways, the simplest of which consists in generating at s, when the code signal of the station is received, a pulse which triggers V to produce vertical scanning, and to use a blocking device of well-known type to extinguish the beam in the absence of vertical scanning.

Figure 3:
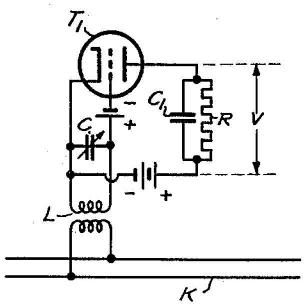
Fig. 3 is a circuit diagram of a selective control element suitable for use in Fig. 2.
Figure 4:
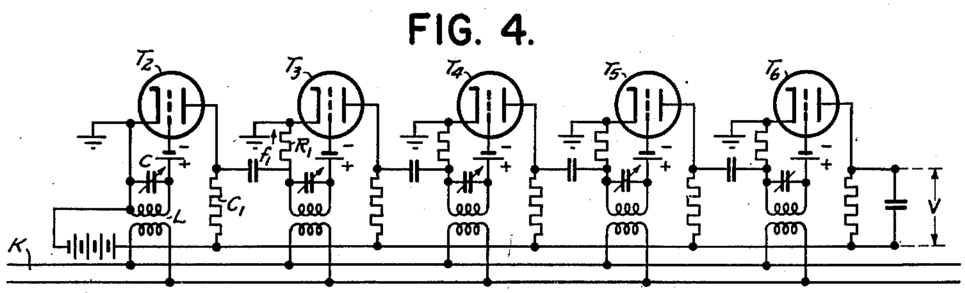
Figs. 4 and 5 are varied forms of said control element.

Numerous arrangements may be employed to produce the image scanning trigger pulse from the code signal. A simple arrangement is illustrated in Fig. 3, adapted for use with a code signal consisting of a single train of waves of a single frequency. The tube $T_1$ normally is blocked, with its grid negatively biased below cut-off. The tuned circuit CL, which is tuned to the code frequency allotted to the particular receiver, is energized when a code signal of that frequency is transmitted over the line, producing output current in the tube and a consequent current flow across resistance R, which produces the triggering voltage pulse for the thyratron circuit V.

Where the code signal consists of a number of consecutive frequencies, such as five, the arrangement illustrated in Fig. 4 may be employed. This system includes five tubes $T_2$—$T_6$, the grid circuit of each being normally biased to cut-off and connected to a tuned circuit coupled to the line K.

The latter circuits are, of course, tuned to five different frequencies whose sequence is characteristic of the code signal of the particular station. When the first train of the code signal has the proper frequency the first tube will operate as in Fig. 3, and will discharge condenser $C_1$. After the first signal train has terminated the recharging of $C_1$ will produce a current across resistor $R_1$ in the grid-cathode circuit of the second tube which, together with the reception of a second train of proper frequency in the tuned portion of the latter circuit will product an output from the latter tube. The remaining signal trains will successively energize the other tubes in the same manner if the successive trains have the proper frequencies, producing a voltage across the resistor in the output circuit of the last tube which provides the exciting pulse for the thyratron circuit V. The time constant of the tuned unit of each tube must be such that during the period when a tube is affected by a code signal train of proper frequency the effect of the energizing of the preceding tube must continue. The time period must also be sufficiently long so that the system will be prepared to receive the image transmission which will follow.

Figure 5:
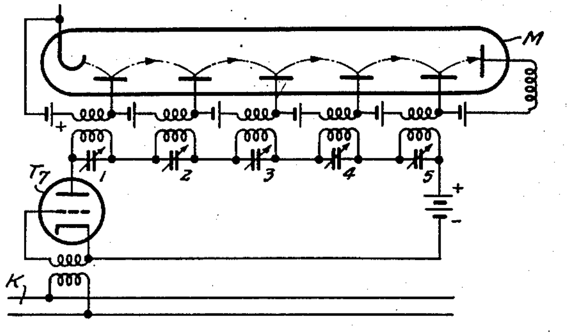

Another principle which may be used for control of a switching system is based on changes in the amplitude of the current which may be produced by a five train signal in various ways hereafter indicated, provided the position of a particular signal frequency train at different points in the series of trains produces a different output amplitude. This result can be obtained, as illustrated in Fig. 5, by the use of an electron multiplier M of known type, in which the successive plates on which the electron stream impinges are connected across a series of secondary transformer windings with interpolated batteries. The transformer primaries form the inductances of a series of tuned circuits connected to the output of an amplifier tube $T_7$ whose control grid is inductively coupled to the line K. With this arrangement each transformer will respond to a wave train of a certain frequency; and when the proper code signal is received the trains will actuate the transformers in the numbered sequence. This will result in five pulses at the output of the electron multiplier M, the first pulse being multiplied by four stages, the second by three, and so on, so that the five pulses will form a sequence of decreasing amplitude, a condition which is not produced by any other code signal, since such other signals either will not energize some of the transformers or will energize them in another order. This steadily decreasing output may be used to trigger the receiver. A similar result may be obtained by using a five grid tube, each grid being suitably connected to a transformer. It is of course understood that by reversing the transformer position an increased output may likewise be obtained.

The code signals may likewise include variations not only in frequency but also in the durations of the trains, which make it possible to employ a switching system of simple design using selection methods based on duration which are commonly used in television for separating the image and line synchronizing signals.

When a cathode ray tube CT is used, as illustrated in Fig. 2, the image on its screen is reproduced by known photographic methods; and if necessary an intermediate film may be made. This system is applicable where the image production time is one second.

A transmitting station such as $E_3$ directly connected to the cable may employ an iconoscope, which receives the light projection of the image to be transmitted, and then is scanned by the cathode ray. The vertical scanning motion of the ray produced by the image sawtooth wave may be triggered by a release system similar to those shown in Figs. 3 and 4, actuated by the code signal from the transmitter which is specifically assigned to station $E_3$. The transmitted image will include the code signal of the receiving subscriber, so that correct switching will be assured.

The arrangement which will provide the switching at V′ of a message for $R_2$ in response to the appropriate receiving station code signal will be apparent from the above description without additional explanation. However, there are two conditions which should be noted. First, if the line $V'R_2$ has a sufficiently wide pass band, the image signals are routed directly through V′ to $R_2$, normally over a coaxial cable. Various selective switching arrangements are possible, some of which involve the unbiasing of the tube in V′ to a point above cutoff, caused by the received signal as above outlined. The time constant of the circuit $C_1R_1$ which releases the tube must be sufficient so that the voltage across $R_1$ (where the arrangement of Fig. 4 is used) will vary very slightly during the passage of the image, eliminating the possibility that the succeeding images will be switched to $R_2$.

Figure 6:
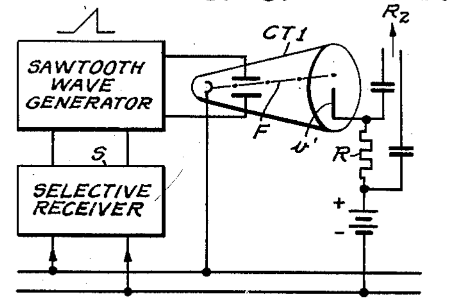
Fig. 6 is a circuit diagram of a receiving station switching circuit.

A thyratron may be used to disconnect the receiver from the line, actuated by a signal at the end of one image which will eliminate possible reception of succeeding images. Another method, illustrated in Fig. 6, employs a cathode ray tube $CT_1$ connected to the line K through a selective receiver S so that, when the proper code signal is received a sawtooth wave triggered by the selector will cause the tube beam F to descend and contact a conducting vertical line $v'$ connected to one side of the conductor through a resistor R and a battery, the said lines to the receiver $R_2$ being connected across the resistor. With this arrangement the receiving circuit will be completed when the code signal is received and the connection will be broken at the end of the image period and the simultaneous termination of the sawtooth wave. The shunt across the coaxial cable has a resistance much larger than the characteristic impedance of the coaxial line.

Second, if the line $V'R_2$ has a pass band insufficient to pass the image waves, the image must first be recorded and then repeated at a lower speed to the receiver. This arrangement involves the use of known methods, and the recording is controlled by the synchronizing signal. The recording may include the use of an iconoscope which is then scanned by the same beam to transmit the image to the receiver during a time subsequent to the reception period.

Figure 7:
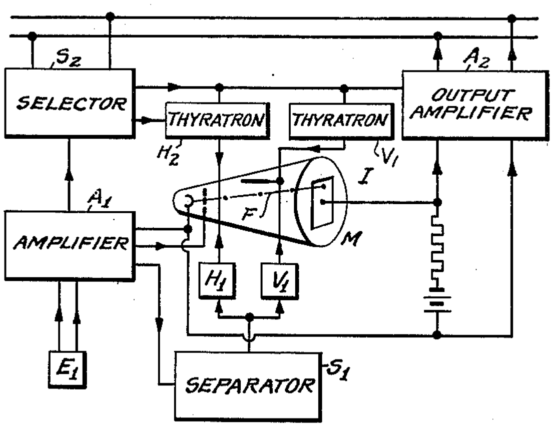
Fig. 7 is a circuit diagram of a portion of a transmitting circuit including an arrangement for storing and re-transmitting a message.

Fig. 7 is a diagram of an arrangement which may be used at $V_1$ or $V_2$ (Fig. 1) to transmit signals from $E_1$ or $E_2$ to the coaxial cable during the periods provided for these transmitters. The image signals from the transmitter $E_1$, transmitted at a speed suitable for the characteristics of the auxiliary line, are recorded by the cathode ray F on the mosaic M of the iconoscope I. The amplifier circuit $A_1$ provides the necessary grid modulation, and also by a conventional method controls through separator $S_1$ the synchronized signals ($V_1$ and $H_1$) for the control of the vertical and horizontal sweeps respectively. The selector $S_2$ supplies to the vertical and horizontal thyratrons in $V_2$ and $H_2$ the synchronized impulses which trigger these devices at the beginning of the period reserved on the coaxial cable for transmission from $E_1$. Selector $S_2$ is locked from $A_1$ during the recording of the image from $E_1$. Output amplifier $A_2$ is unlocked during the output scanning of the image on M, which is controlled from $S_2$. The short persistence time of the signals on the mosaic may make it necessary to use an intermediate image on a cathode ray tube.

Another and more extensive system uses an arrangement similar to that of the Baudinot telephone system. In this arrangement each image is assigned a number in the series of N images which follow one another during one cycle. Each cycle is preceded by a starting signal. The switching of the images is carried out in accordance with the order of each of them in the cycle. Thus, there are three types of synchronizing signals, each of which may vary in different ways, either according to length or frequency or by length and frequency. These signals are the cycle start, the period or image signals, and the line signals, the latter controlling the scanning of each line. The images having a certain position in the sequence of periods, this sequence being designated for convenience as $N_0$, are switched to a selected receiver. This involves a selection on the basis of time.

Figure 8:
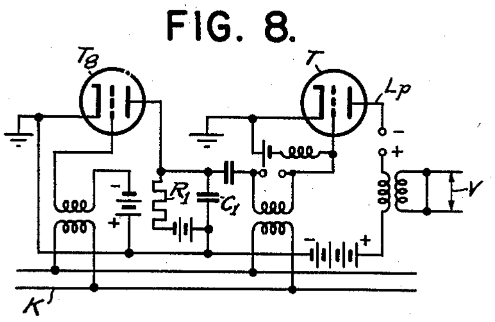
Fig. 8 is a circuit diagram of part of a receiving station including an arrangement for switching particular messages to said station.
Figure 9:
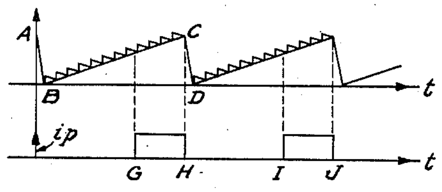
Fig. 9 is a graph illustrating the operation of Fig. 8.

A switching arrangement of tihs type may employ the circuit shown in Fig. 8. In this circuit the impulse marking the beginning of a cycle is applied to the grid of the first tube $T_8$ and triggers the generation of the series sawtooth voltage ABCD (Fig. 9) which is obtained by the conventional method through alternate charge and discharge of the $C_1$ $R_1$ unit. Since the voltage BC rises continuously during a cycle, the voltage values along this line indicate the time lapse from the beginning of the cycle. To the voltage thus obtained the voltage created by the image or period impulses is added, as hereafter indicated, and the resultant voltage is applied to the grid of the thyratron T in a sawtooth wave generating circuit. The resultant voltage is represented by the serrated line above BC, which includes sudden increases as each image impulse is received.

The thyratron T is adjusted so that it is triggered when the resultant voltage applied to it is produced by the image impulse at the beginning of the period in the cycle assigned to the connected apparatus. The deenergizing is effected by the following cycle impulse acting in the appropriate direction on the plate circuit of the thyratron. The plate current of the thyratron is indicated by the rectangle GHIJ in Fig. 9, the beginning of each rectangle being in register with the triggering impulse at the beginning of the selected period. With this arrangement square waves are obtained whose ends H, J are separated by a constant time and whose durations GHIJ are adjustable at will.

Figure 10:
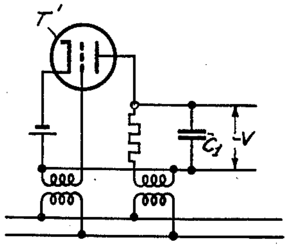
Fig. 10 is a circuit diagram of a modification of Fig. 8.
Figure 11:
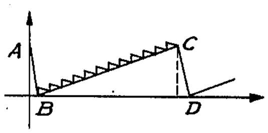
Fig. 11 is a graph illustrating the operation of Fig. 10.

Fig. 10 is another circuit for obtaining the same general results. The cycle synchronizing impulses are applied to the grid of a thyratron T', and the period or image impulses act in the appropriate direction between A and B. The arrangement differs from the conventional system for the production of a sawtooth voltage only by the replacement of a constant voltage between A and B by a discontinuous voltage in the proper direction, produced by the sequence of period impulses. The output voltage $v$, illustrated in Fig. 11, has a similar double sawtooth structure with a suitable increase upon the arrival of an image impulse. This voltage is applied to the image scanning thyratron circuit, adjusted for triggering at a voltage value corresponding to that on the graph of Fig. 11 which represents the period selected for the associated apparatus.

A system of transmitter arrangement may be organized to increase the total number of channels and facilitate the commutating action incident to selection of the messages from particular transmitters. For instance, a number N' of groups, each consisting of N transmitters, may be located adjacent to the origin of the coaxial cable, each transmitter having $n$ lines in its image transmission. The scanning of the iconoscope for each group is determined by a group signal from a suitable signal source, which thereby determines the order in which the group images will be scanned. This arrangement is illustrated in patent application Serial No. 758,852. In this system the group signal advantageously coincides with the cycle, period and line signals.

Figure 12:
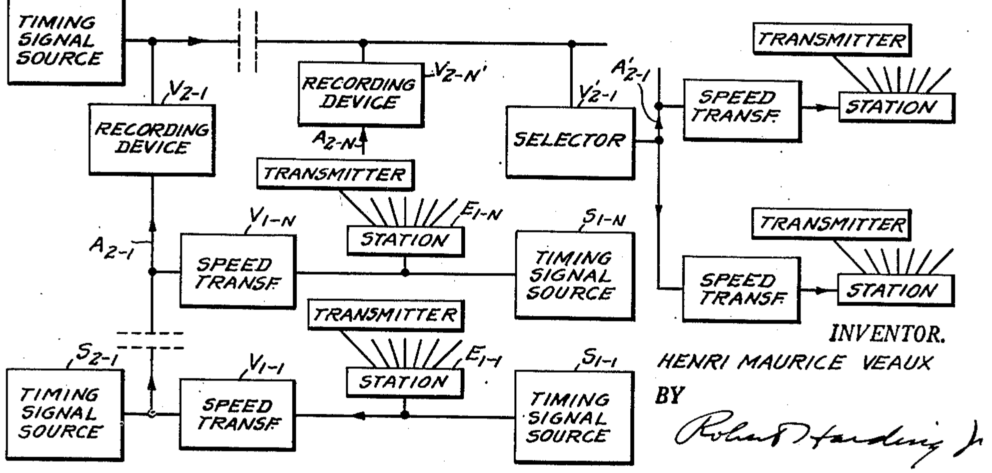
Fig. 12 is a diagram of a system illustrating the transmission of signals from a large number of stations over a single transmission line.

An arrangement of this sort may be used in a network such as that illustrated in Fig. 12. In this arrangement individual transmitters are arranged in groups, each group transmitting its messages through a station E to a speed transforming recording station $V_1$ under control of a timing signal source $S_1$. In the illustrated embodiment there are N units of the type indicated, the signal sources running from $S_{1-1}$ to $S_{1-N}$, the group recorders from $E_{1-1}$ to $E_{1-N}$ and the speed transformers from $V_{1-1}$ to $V_{1-N}$, these units constituting a primary group. Only the end elements of one unit are illustrated.

The primary group units transmit their signals in succession to a recording and speed transforming element $V_2$ under timing control of signals from the source $S_2$. This group of primary units, with a common timing signal source and recording device, constitutes a secondary unit, and a series of these units may be provided, the signal sources being numbered from $S_{2-1}$ to $S_{2-N'}$ and the recording device from $V_{2-1}$ to $V_{2-N'}$, the signals being transmitted between the signal sources and the recording devices over lines $A_{2-1}$ to $A_{2-N}$. Only the first secondary unit and the recording device of the last unit are shown.

The signals recorded on the devices $V_{2-1}$ to $V_{2-N'}$ are successively retransmitted to the main line under the control of timing signals from the source $S_3$. Various timing schedules can be employed. Assume, for instance, that the duration of a single period established by the period signals from $S_3$, is one second, and that the number of lines on an image at $V_1$ is 10, comprising one line for each of the ten transmitters connected to each $E_1$ station. The messages recorded at each $E_1$ are retransmitted over $A_2$ in $\frac{1}{20}$ of a second, the interval between the two consecutive signals from $S_2$, which allows $\frac{1}{20}$ of a second for recording and $\frac{1}{20}$ of a second for retransmitting. Similarly the messages recorded at $V_2$ are retransmitted in $\frac{1}{40}$ of a second on a similar basis, their sequence and timing being controlled by signals from $S_3$. This timing at $S_1$, $S_2$, and $S_3$ respectively may be produced by the perforated dial and light system already described, either with a unit at each signal source or with a single unit at $S_3$ arranged to provide the control signals for $S_1$ and $S_2$ also.

The receiving stations may be connected by a similar network, the selector $V'_2$ selecting signals from an appropriate source $V_2$ and transmitting these messages by arrangements already indicated to selected receivers or groups of receivers over line $A'_2$. With this arrangement the signals from any source or from selected primary or secondary units may be transmitted to a large number of receivers. This arrangement may likewise be used with appropriate corrections in telephone systems.

For convenience the word "image" has been used herein to denote a visual representation which is adapted for facsimile transmission by a standard scanning process, and includes pictures, sketches and the like as well as telegrams, written messages and other indicia. Reference to a transmission line is intended to include not only metal conductors but also conducting systems which include a radio link.

I claim:

A facsimile transmitting system comprising a plurality of transmitting stations, a plurality of receiving stations, a common transmission line for said stations, means at each transmitting station for electrically transmitting a facsimile over said line during one of a series of successive periods forming a cycle, said facsimile including receiving station identification indicia, means for transmitting synchronizing cycle and period signals to said stations over said line at the beginning of each cycle and period, respectively, means responsive to said signals for actuating the transmitting means at a transmitting station during a predetermined period, including a first sawtooth wave generator coupled to said line and triggered by the cycle signal, said wave having a duration equal to that of a cycle, a second sawtooth wave generator coupled to the line and triggered by each period signal, the latter wave having a duration equal to that of a period, and a transmission starting device actuated by the combined action of said first and second sawtooth wave generators, and means at each receiving station responsive to a particular receiving station identification indicia for causing said station to receive the transmitted facsimile containing said indicia, said transmission starting device including an electron discharge tube having a grid connected to both generator outputs and normally maintained at a bias having a value below cut-off less than the combined generator output value at the beginning of a selected period but greater than the latter value during preceding periods, said transmission starting device being actuated by the output of said tube, whereby transmission is started at the beginning of the selected period.

HENRI MAURICE VEAUX.

REFERENCES CITED

The following references are of record in the file of this patent:

UNITED STATES PATENTS

| Number | Name | Date |
|---|---|---|
| 2,142,339 | Weaver | June 3, 1939 |
| 2,174,490 | Somers | Sept. 26, 1939 |
| 2,307,728 | Mertz | Jan. 5, 1943 |
| 2,351,231 | Ridings | June 13, 1944 |
| 2,381,901 | Goldsmith | Aug. 14, 1945 |
| 2,381,902 | Goldsmith | Aug. 14, 1945 |
| 2,392,356 | Bacon | Jan. 8, 1946 |
| 2,393,329 | Niample | Jan. 22, 1946 |
| 2,406,165 | Schroder | Aug. 20, 1946 |
| 2,406,787 | Bacon | Sept. 3, 1946 |
| 2,408,108 | Teal | Sept. 24, 1946 |
| 2,425,019 | Wise | Aug. 5, 1947 |
| 2,437,027 | Homrighous | Mar. 2, 1948 |
| 2,462,111 | Levy | Feb. 22, 1949 |
| 2,481,410 | Goldsmith | Sept. 6, 1949 |